US008705618B2

(12) United States Patent
Thoreau et al.

(10) Patent No.: US 8,705,618 B2
(45) Date of Patent: Apr. 22, 2014

(54) METHOD AND DEVICE FOR CODING A VIDEO IMAGE WITH A CODING ERROR ESTIMATION ALGORITHM

(75) Inventors: Dominique Thoreau, Cesson Sevigne (FR); Edouard François, Bourg des Comptes (FR); Lila Huguenel, Rennes (FR)

(73) Assignee: Thomson Licensing, Bouologne-Billancourt (FR)

( * ) Notice: Subject to any disclaimer, the term of this patent is extended or adjusted under 35 U.S.C. 154(b) by 1231 days.

(21) Appl. No.: 12/085,329

(22) PCT Filed: Oct. 24, 2006

(86) PCT No.: PCT/EP2006/067698
§ 371 (c)(1),
(2), (4) Date: May 21, 2008

(87) PCT Pub. No.: WO2007/060071
PCT Pub. Date: May 31, 2007

(65) Prior Publication Data
US 2009/0041119 A1    Feb. 12, 2009

(30) Foreign Application Priority Data
Nov. 22, 2005 (FR) .................................. 05 53553

(51) Int. Cl.
*H04N 7/26* (2006.01)
(52) U.S. Cl.
USPC .................................................... 375/240.03
(58) Field of Classification Search
USPC ........................ 375/240.01, 240.03
IPC ...................................................... H04N 7/26
See application file for complete search history.

(56) References Cited

U.S. PATENT DOCUMENTS

2006/0215763 A1* 9/2006 Morimoto et al. ....... 375/240.18

FOREIGN PATENT DOCUMENTS

| EP | 0982951 | 3/2000 |
| JP | 2005086249 | 3/2005 |
| JP | 2005244666 | 9/2005 |

OTHER PUBLICATIONS

Hyungjoon Kim et al: "Low-Complexity macroblock mode selection for H.264/AVC encoders", Image Processing, 2004, ICIP '04. 2004 Int'l Conference on Singapore Oct. 24-27, 2004,IEEE, pp. 765-768.
Yu-Wen Huang et al.; Analysis, Fast Algorithm, and VLSI Architecture Design for H.264/AVC Intra Frame Coder, IEEE Transactions on Circuits and Systems for Video Technology, vol. 15, No. 3, Mar. 2005, pp. 378-401.

(Continued)

*Primary Examiner* — Jay Patel
*Assistant Examiner* — Yulin Sun
(74) *Attorney, Agent, or Firm* — Tutunjian & Bitetto, P.C.

(57) ABSTRACT

The method comprises a coding of a source block according to a coding mode wherein the selection of the coding mode is carried out, for a source block, according to coding error estimations and source block coding cost estimations for the different coding modes tested, the coding error being estimated, for a coding mode, according to the sum of the absolute values of coefficients obtained after a mathematical transformation in the frequency domain of the residue block related to this coding mode and as a function of the sum of absolute values of quantized coefficients corresponding to this coding mode. An application is the decision of the coding mode for data using the MPEG 2 or MPEG4-AVC standard.

8 Claims, 1 Drawing Sheet

(56) References Cited

OTHER PUBLICATIONS

Changsung Kim et al: "A Feature-based Approach to Fast H.264 Intra/Inter Mode Decision", Circuits and Systems, 2005, IEEE Int'l Symposium on Kobe, Japan May 23-26, 2005, pp. 308-311.

H. Kim et al.: "Low-Complexity Rate-Distortion Optimal Macroblock Mode Selection and Motion Estimation for MPEG-Like Video Coders", Jul. 2005, IEEE Transactions on Circuits and Systems for Video Technology, pp. 823-834.

Search Report Dated Feb. 28, 2007.

* cited by examiner

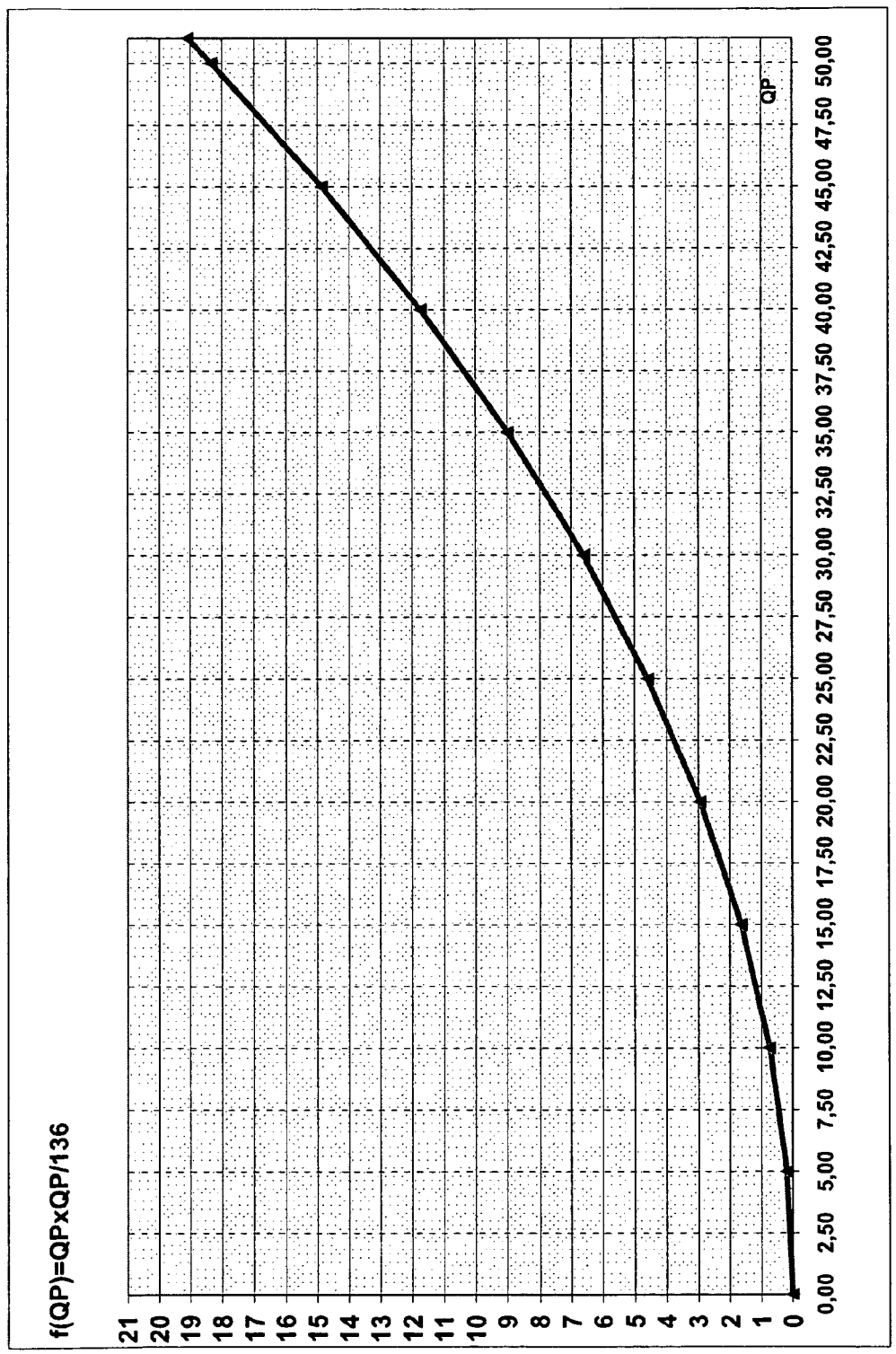

METHOD AND DEVICE FOR CODING A VIDEO IMAGE WITH A CODING ERROR ESTIMATION ALGORITHM

This application claims the benefit, under 35 U.S.C. §365 of International Application PCT/EP2006/067698, filed Oct. 24, 2006, which was published in accordance with PCT Article 21(2) on May 31, 2007 in French and which claims the benefit of French patent application No. 05 53553, filed on Nov. 22, 2005.

The invention relates to a method and a device for coding video pictures, more particularly to a coding mode decision algorithm for a block of a picture.

The domain is that of the transmission and storage of video using compression algorithms compatible with standards such as MPEG2 and MPEG4-AVC.

The aim of the coding decision in the coder is to choose, according to a defined criterion, the best coding mode for an entity of the picture, generally a macroblock comprising a luminance block sized 16×16 pixels, from among a certain number of modes known as intra picture modes taking into account the information in the picture being coded and inter picture modes taking into account information in one or several pictures previously coded.

The algorithm dedicated to the coding decision can, depending on the complexity of implementation available, take the form known as:
  a priori
  a posteriori.

The a priori based algorithm is simpler but offers the most modest performance in terms of bitrate/distortion, the more complex form being the a posteriori based algorithm, which has the best performance.

The coding decision process of the macroblock is realized in different ways and has been the object of much research that can however be classed in the following manner:

In a first approach, the best inter prediction mode is obtained from among the group of inter prediction modes, then the best intra prediction mode is determined from among the group of intra prediction modes if there are several intra prediction modes, then a selection is made between the best inter mode and the best intra mode to finally implement the macroblock coding. This type of approach generally corresponds to that proposed in the algorithms of the reference models. The algorithmic tools are based on inter-picture difference measurements and the calculation of local activity. Reference may be made for example to the document MPEG-4 Video Verification Model version 18.0, section 3.3.2.3 (INTRA/INTER mode decision).

Another technique is totally a posteriori and consists in assuming, for each coding mode, the cost of coding the macroblock as well as the quality of recovery. This is obtained by calculation of the psnr (peak signal-to-noise ratio) or the sad (sum of absolute difference) or the satd (sum of absolute transformed differences) and more particularly the Hadamard transforms or the sse (sum of squared error) or the ssd (sum of squared differences).

This type of algorithm then performs the calculation of the difference between the source macroblock and the reconstructed block or macroblock, for each mode. The reconstructed block requires knowing the predicted block or the prediction block, from which is deduced the residue block, the DCT (Discrete Cosine Transform) coefficients of the residue block, the quantization of DCT coefficients, the inverse quantization and the inverse DCT. This, which represents the reconstructed residue block, is added to the prediction block to supply the reconstructed source block. In the case of a pure intra mode, that is to say without prediction, the value of the prediction block is taken to equal zero.

Such algorithms are described for example in the European patent application document published on 1$^{st}$ Mar. 2000 under the reference EP0982951 and entitled "picture compression process" or in the document of H Schwarz, T Wiegand, entitled "An improved MPEG4 coder using lagrangian coder control", March 2001.

The different recovery quality measurements sad, satd, ssd, and psnr, are expressed in the following expressions:

$$sad = \left( \sum_{i,j=0}^{i,j=15} |MB_{src}(i,j) - MB_{rec}(i,j)| \right)$$

$$satd = \left( \sum_{i,j=0}^{i,j=15} |HadamT(MB_{src}(i,j) - MB_{rec}(i,j))| \right)$$

$$sse = \left( \sum_{i,j=0}^{i,j=15} (MB_{src}(i,j) - MB_{rec}(i,j))^2 \right)$$

$$psnr = -10 \text{Log} \left( \sum_{i,j=0}^{i,j=15} (MB_{src}(i,j) - MB_{rec}(i,j))^2 \right) / (255^2 \times 256)$$

where:
  i, j: line and column indices of pixels contained in the macroblock MB,
  $MB_{src}$ source macroblock,
  $MB_{rec}$ reconstructed macroblock.

The satd measurement corresponds to the sum of the absolute value of the Hadamard transform coefficients of the differences contained, for this example, in a block of size 16×16 pixels.

The a posteriori decision criterion used in the reference algorithm MPEG4-AVC is the following:

$$J_{mode} = sse_{mode} + \lambda_{mode} \cdot MB_{cost}$$

where
  $J_{mode}$ is the entity from which the minimum "cost" will be sought and which allows selection of the final coding mode,
  sse is the measurement of the mean squared error between the source pixels and the pixels after reconstruction, that is to say after inverse quantization $Q^{-1}$ then inverse transformation $DCT^{-1}$ then addition of the prediction block,
  $\lambda_{mode}$, classically known as the Lagrangian factor, a weighting factor depending on the quantization step QP,
  $MB_{cost}$ the real cost of coding the macroblock.

The selection algorithms of the a priori coding mode are less efficient than the a posteriori algorithms, although the latter require more complex calculations, requiring a significant amount of processing time.

One of the purposes of the invention is to overcome the aforementioned disadvantages.

The purpose of the invention is a method for coding a video picture of a sequence of pictures comprising a splitting of the picture into blocks then a coding of a source block according to a coding mode from at least one of the predictive coding modes of inter picture type using information from a preceding and/or following picture and/or of intra picture type using information from the current picture, a predictive coding mode of a source block carrying out a cosine transformation then a quantization of a residue block, that is the difference between the source block and a prediction block calculated from said information, to supply quantized coefficients, characterized in that the selection of said coding mode is carried out for said source block, according to coding error estimations and estimations of the cost of coding the source block for the different coding modes tested, the coding error being estimated, for a coding mode, according to the sum of the absolute values of the coefficients obtained after a mathematical transformation in the frequency domain of the residue block relative to this coding mode and relative to the sum of the absolute values of said quantized coefficients corresponding to this coding mode.

According to a particular implementation, the estimation of the coding error is equal to:

$$SATD_{dec\_est} = SATD_{pred} - f(QP) \times Energy_{TQ} \text{ with}$$

$SATD_{pred}$, the sum of absolute values of the coefficients of residue blocks obtained after a Hadamard transformation, QP the quantization step, f(QP) a predefined function of the quantization step, Energy the sum of said quantized coefficients.

According to a particular implementation, the f(QP) function is equal to $f(QP) = \delta \times (QP)^2$, $\delta$ being a predefined constant.

According to a particular implementation, the selection of the coding mode depends on a $J_{mode}$ parameter:

$$J_{mode} = SATD_{dec\_est} + W_{QP}(\alpha.Header_{cost} + \gamma.Energy_{TQ})$$
with $W_{QP}$, a value according to the quantization step QP, Header, a cost in bits of a coding header for the coding of the macroblock in a data stream, $\alpha$ and $\gamma$ the predefined value parameters.

According to a particular implementation, the $W_{QP}$ parameter is proportional to the quantization step QP.

According to a particular implementation, $\delta = 1/136$ to within 10%, $\alpha = 2$, $\gamma = 4$ and $W_{QP} = QP/5$.

According to a particular implementation, a motion estimation carries out a correlation calculation from the Hadamard transform to obtain said information from the preceding picture.

The invention also relates to a coding device for implementing the method previously described, comprising a processing circuit and a memory circuit to calculate the coding error estimations for the different coding modes, characterized in that the processing circuit carries out the calculations of $SATD_{dec\_est}$ estimations according to the expression $$SATD_{dec\_est} = SATD_{pred} - f(QP) \times Energy_{TQ}$$

and in that the memory circuit comprises the predetermined values of the function f(QP) for different values of the quantization step QP distributed over its evolution range.

The proposed method is situated between the a priori and a posteriori techniques, that is to say it implements parameters produced by a posteriori measurements and estimates produced by a priori measurements.

The invention makes it possible to obtain a bitrate/distortion performance close to an a posteriori based decision with a reduced algorithmic complexity, the reconstruction of macroblocks being unnecessary.

Other specific features and advantages will clearly emerge from the description, provided as a non-restrictive example and referring to FIG. 1.

The coding method, for example MPEG 4 type part 10 or H264, performs coding in intra or inter mode of a source macroblock $MB_{src}$.

Coding in inter mode effects a difference between the macroblock source $MB_{src}$ and a predicted macroblock $MB_{pred}$ calculated from one or more previously coded reference pictures, reconstructed by the local decoder, and motion information designating the reconstructed block or blocks correlated to the source block, to be taken into account for the calculation of the prediction macroblock.

Intra mode predictive coding takes account, for the calculation, of the prediction macroblock, of information in the picture to which the source macroblock to be coded belongs, for example information on mean luminance or the luminance values of pixels of previously coded neighbouring macroblocks. The H264 standard describes a certain number of intra prediction modes.

The invention relates to a coding method implementing a coding decision algorithm inspired by the a posteriori decision criterion previously presented ($J_{mode}$).

This coding decision is based on the following parameter measurements:

an a priori measurement, that is the $SATD_{pred}$ calculation, namely a measurement applied to the pixels to be coded or residual prediction error or residue block in the pixel domain for the intra and inter picture coding modes, a measurement concerning the quantization coefficients comprising a first term $Energy_{TQ}$ and a second term $Header_{cost}$:

$Energy_{TQ}$ corresponds to the sum of the coefficients after quantization, coefficients obtained after DCT transformation of the residue block in the pixel domain. This parameter will, in a way, provide information on the quantity of information required to reconstruct the macroblock.

$Header_{cost}$, corresponds to the coding cost of the macroblock header. Having knowledge of all the information relating to the macroblock, such as the number of coefficients to be coded, the coding cost of the header can be calculated precisely.

This last measurement is weighted by the quantization step QP used to quantize the macroblock coefficients, via a weighting factor $W_{QP}$ depending directly on the quantization step.

Hence, the coding mode decision algorithm is given by the following expression:

$$J_{mode} = SATD_{dec\_est} + W_{QP}(\alpha.Header_{cost} + \gamma.Energy_{TQ})$$

$SATD_{dec\_est}$ is the estimated decoded SATD, explained further down. Its purpose is to supply a reconstruction error estimation or decoding error, SATD based, after coding.

$W_{QP}$ is a weighting factor depending on the quantization step QP.

$(\alpha.Header_{cost} + \gamma.Energy_{TQ})$, is an expression to furnish an information whose value must be the closest to the evolution of the coding cost of the macroblock. The parameters $\alpha$, $\gamma$ allow weighting of the quantities $Header_{cost}$ and $Energy_{TQ}$. It being understood that $Header_{cost}$ represents the coding cost in macroblock header bits while $Energy_{TQ}$ corresponds to a sum of coefficients after quantization.

The $J_{mode}$ value is calculated for each available coding mode and the one that gives the minimum value is retained for the actual coding of the macroblock.

The estimation of error $SATD_{dec\_est}$ between the source and the reconstructed picture is initially approximated by taking into account the predictive error $SATD_{pred}$ corresponding to the sum of the coefficients of the residue block in the Hadamard transformed pixel domain, subsequently this prediction error $SATD_{pred}$ is reduced using the weighted sum of the quantized values of the coefficients of the residue block in the DCT transformed pixel domain.

Hence, the relationship allowing the acquisition of an estimation of the error inherent in the $SATD_{dec\_est}$ coding from $SATD_{pred}$ is the following:

$$SATD_{dec\_est} = SATD_{pred} - f(QP) \cdot Energy_{TQ}$$

where:
$SATD_{pred}$ is the SATD calculated in a priori between the source macroblock and the prediction macroblock, and which corresponds to the prediction error and to the satd equation previously described in which the term $MB_{rec}$ is replaced by $MB_{pred}$, $$-Energie_{TQ} = \sum_{i \in MB} |TQ_i|$$

is the sum of the absolute value of the coefficients after DCT transformation and quantization, f(QP) is a weighting parameter, according to the value of the quantization step QP.

The quantization step used is calculated in the classic manner, for example by using a bitrate control algorithm.

In the case where a negative value for $SATD_{dec\_est}$ is obtained the value zero is forced.

The $SATD_{pred}$ term corresponds to the sum of residue block coefficients, obtained after Hadamard transformation of the residue block in the pixel domain. The Hadamard transformation is proposed here as it has generally been previously calculated during the motion estimation and is therefore available. It is also a simpler calculation than the DCT transformation. This choice however is not exclusive and the use of the DCT transformation of the residue block is also in the domain of the invention.

The term $Energy_{TQ}$ corresponds to the sum of the quantized coefficients, obtained after DCT transformation and quantization of the residue block in the pixel domain and the term f(QP) determines a value as a function of the quantization step.

The $SATD_{dec\_est}$ value allows the coding or reconstruction error to be estimated, that is to say the error between the source block and the reconstructed block, without being required to calculate the reconstructed block, that is the decoded source block.

If for example the luminance values of the residue block are sufficiently low to give null quantized coefficients, that is less than the quantization step, the Energy value is equal to zero and the coding or reconstruction error is estimated at $SATD_{pred}$ corresponding to the transformed residue block according to the Hadamard transformation, this information relating to residues being effectively "lost" during coding.

If for example the predicted block is null, as in the case of pure intra mode, that is without prediction, the $SATD_{pred}$ prediction corresponds to the transformed source block, a value from which is subtracted a value representative of the transformed source block after quantization, for the estimation of the coding error.

This $SATD_{pred}$ relating to the Hadamard transform of the difference between the source block and the predictive block, can be considered as an estimation of the maximum coding error or prediction error, the predictive block used at the coder and at the decoder being the same. This maximum error becomes the estimated error in the case where the quantized residue block is null, giving a reconstructed source block to the decoder equal to the predicted block.

But the prediction error is minimized by the transmission of the quantized and coded residue block, the reconstructed block at the decoder being then the predicted block to which is added the decoded residue block. In this case, the reconstruction error, at the decoder, is less than the previously defined initial prediction error and the reconstruction error estimation then corresponds to the estimation of the minimized prediction error of an estimation of the decoding value of the residue block, based on the quantized coefficients block, which is the residue block transformed and quantized, and on the quantization step.

FIG. 1 illustrates an example of the curve corresponding to the f(QP) function, empirically determined, for a quantization step between 0 and 51.

This curve can be approximated by a squared function of the quantization step:

$$f(QP) = \delta \times (QP)^2$$

More precisely, the value of $\delta$ empirically determined is equal to 1/136.314, this value can of course be chosen roughly, for example in a range of more or less 10%, without noticeably affecting the efficiency of the weighting of the energy parameter, In one embodiment, the $W_{QP}$, $\alpha$ and $\gamma$ parameters have values of:

$\alpha = 2$
$\gamma = 4$
$W_{QP} = QP/5$

These values were defined after a large number of simulations on a set of varied sequences so that the algorithm has a behaviour as close as possible to that of an a posteriori decision algorithm whatever the value of the quantization step QP.

Here as a comparison are the results of simulations that allow positioning of the performances of this algorithm with respect to totally a priori and a posteriori coding decisions. The bitrate obtained with the a posteriori algorithm is taken as a reference in the table below.

|  | New algorithm | A priori algorithm |
|---|---|---|
| auto+ | 4.3 | 17.87 |
| bball | 4.75 | 11.09 |
| bigdil | 3.86 | 9.9 |
| bus | 2.95 | 11.2 |
| ski | 4.26 | 18.26 |
| stefan | 3.23 | 12.52 |

The first column indicates typical sequences well known in the picture processing domain. The second column indicates, for each sequence, the increase of the bitrate by applying the algorithm according to the invention, as a percentage of the bitrate relative to an a posteriori decision algorithm, column 3 indicates the increase of the bitrate relative to an a priori algorithm. The percentage gain in terms of bitrate is calculated by comparing bitrate/distortion curves according to the method recommended by G Bjontegaarg "Calculation of average PSNR differences between RD-Curves", document VCEG-M33, March, 2001.

The invention also relates to a device for coding video picture sequences. It comprises, in a known manner, a processing circuit, a motion estimation circuit, a DCT transformation circuit, a quantizer used for coding, according to the standard MPEG 4-AVC for example. The processing circuit implements, among other things, the coding mode decision algorithms such as those previously described. The function f(QP) is memorized and the processing circuit carries out the calculation of this function for the quantization step value corresponding to the macroblock to be coded.

According to a particular implementation, this calculation is replaced by the memorization of points on the curve for different values of the quantization step distributed over its range of evolution. The processing circuit will search for the f(QP)value in this memory at the address corresponding to the quantization step used. This memory can also directly contain, that is without using the f(QP) curve, the values obtained during the empirical calculations.

By virtue of its design, estimation of distortion, estimation of coding cost with dependence with respect to the quantization step QP, the decision algorithm can be implemented in all types of coder permitting such estimations and in particular for the selection of the sub-partitions comprising a macroblock. Considering the mpeg4-AVC coding standard and concerning the 16×8 inter coding mode for example, that corresponds to a macroblock composed of two sub-partitions of size 16×8 pixels, the algorithm described can be used to determine, for each of the sub-partitions, the best prediction from among those from different reference pictures obtained, these are prediction sub-partitions, via the motion estimator.

In the same spirit, and if the calculation load is not taken into account, this type of algorithm can be implemented for the calculation of the motion estimation. Hence, the criterion allowing the correct mapping of a prediction block to be estimated, via the motion vector, with the current block to be predicted, a criterion generally based on measurement of type sad, satd even sse, can be replaced by the algorithm described in this document. From the motion estimation, the implementation of this criterion gives an idea of the impact on the "cost" of $J_{mode}$ type coding. It is therefore possible to take into account this cost information during the calculation of the motion estimation and the choice of motion vectors.

Concerning the implementation of this criterion, different variations are possible for the parameters below:

$$SATD_{dec\_est} = SATD_{pred} - f(QP) \cdot Energy_{TQ}$$

$$Energie_{TQ} = \sum_{i \in MB} |TQ_i|$$

Hence, for example:
the set of parameters are calculated together on the luminance and chrominance pixels of the macroblock to be encoded,
the set of parameters is calculated only on the luminance signal,
In another variation:
the first term $SATD_{dec\_est}$ is calculated only on the luminance,
the second term ($\alpha.Header_{cost}+\gamma.Energy_{TQ}$) is calculated on the luminance and the chrominance, Hence, in this variation priority is generally given to the luminance quality to the detriment of the chrominance because the chrominance is only considered for the second term, a second term that is supposed to be the during the coding cost of the a posteriori ($MB_{cost}$) decision criterion The choice of mode being determined from the minimum value of $J_{mode}$, for the same value of $Energy_{TQ\_luminance}$ relative to the luminance, it is indeed the value of $Energy_{TQ\_chrominance}$, relative to chrominance that makes the difference.

Finally, please note that in the expression:

$$J_{mode}=SATD_{dec\_est}+W_{QP}(\alpha.Header_{cost}+\gamma.Energy_{TQ})$$

the term $W_{QP}$ plays the weighting role between the quality of probable recovery and the probable coding cost. In fact, if it is required to give priority to recovery quality, we then diminish the $W_{QP\ term}$ whereas conversely, if the lowest probable coding costs are sought, to the detriment of the recovery quality, the $W_{QP}$ will be increased.

The invention claimed is:
1. A method for coding a video picture of a sequence of pictures comprising
dividing a picture into blocks;
performing a coding of a source block according to a coding mode selected from at least one of the predictive coding modes of inter picture type which use information from a preceding and a following picture, and of an intra-coding mode of intra picture type using information from the current picture, and wherein said predictive coding mode performs a cosine transformation and a quantization of a residue block that is the difference between the source block and a prediction block calculated from said information, in order to supply quantized coefficients,
performing the selection of said coding mode for said source block, according to coding error estimations and estimations of the coding cost of the source block for the different coding modes tested, and
estimating the coding error of a current reconstructed block for a current coding mode by the difference between a function of the sum of the absolute values of the difference value coefficients obtained after a mathematical transformation of the residue block from the spatial domain to the frequency domain and before said quantization, and
a function of the sum of the absolute values of said mathematical transformed difference value coefficients following said quantization.

2. Method according to claim 1, wherein the coding error estimation is equal to: $SATD_{dec\_est}=SATD_{pred}-f(QP)\times Energy_{TQ}$
wherein
$SATD_{pred}$,is the sum of absolute values of the difference value coefficients of residue blocks obtained after a Hadamard transformation,
QP is the quantization step,
f(QP) is a predefined function of the quantization step,
Energy $_{TQ}$ is the sum of absolute values of said quantized coefficients.

3. Method according to claim 2 wherein the f(QP) function is equal to $f(QP)=\delta\times(Qp)^2$, $\delta$ being a predefined constant.

4. Method according to claim 2 wherein the selection of the coding mode is a function of a parameter $J_{mode}$;

$$J_{mode}=SATD_{dec\_est}+W_{QP}(.\alpha Header_{cost}+\gamma.Energy_{TQ})$$
with wherein
$W_{QP}$,is a value according to the quantization step QP,
$Header_{cost}$, is a cost in bits of a coding header for the coding of the macroblock in the data stream,
$\alpha$ and $\gamma$ are the predefined value parameters.

5. Method according to claim 4, wherein the parameter $W_{QP}$ is proportional to the quantization step QP.

6. Method according to claim 5, wherein $\delta=1/136$ to within 10%, $\alpha=2$, $\gamma=4$ and $W_{QP}=QP/5$.

7. Method according to claim 2, wherein a motion estimation carries out a correlation calculation from the Hadamard transform to obtain said information from the preceding picture.

8. Coding device for implementing the method according to claim 1, comprising a processing circuit and a memory circuit to calculate the coding error estimations for the different coding modes, wherein the processing circuit carries out an estimation of coding error according to the expression:

$$SATD_{dec\_est} = SATD_{pred} - f(QP) \times Energy_{TQ} \text{ with}$$

$SATD_{pred}$, the sum of absolute values of the difference value coefficients of the residue blocks obtained after a Hadamard transformation, QP the quantization step, f(QP) a predefined function of the quantization step, Energy the sum of said quantized coefficients, and wherein the memory circuit comprises predetermined values of the function f(QP) for different values of the quantization step QP distributed over its evolution range.

* * * * *